US008453238B2

United States Patent
Liardet et al.

(10) Patent No.: US 8,453,238 B2
(45) Date of Patent: May 28, 2013

(54) PROTECTION OF A CIPHERING KEY

(75) Inventors: Pierre-Yvan Liardet, Peynier (FR); Fabrice Marinet, Chateauneuf le Rouge (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 118 days.

(21) Appl. No.: 12/917,792

(22) Filed: Nov. 2, 2010

(65) Prior Publication Data

US 2011/0103584 A1    May 5, 2011

(30) Foreign Application Priority Data

Nov. 4, 2009  (FR) ...................................... 09 57782

(51) Int. Cl.
*G06F 21/00* (2006.01)
(52) U.S. Cl.
USPC ................. 726/22; 726/26; 380/29; 380/255; 380/259; 380/277; 713/187
(58) Field of Classification Search
USPC ................. 380/255, 270; 726/16, 26; 712/36, 712/42, 43; 713/164, 166, 189
See application file for complete search history.

(56) References Cited

U.S. PATENT DOCUMENTS

| 6,928,164 | B1 * | 8/2005 | Ully | ................................ | 380/44 |
| 2004/0096059 | A1 | 5/2004 | Seo | | |
| 2004/0186979 | A1 | 9/2004 | Janke et al. | | |
| 2007/0177720 | A1 | 8/2007 | Bevan et al. | | |
| 2007/0189536 | A1 | 8/2007 | Gammel et al. | | |
| 2009/0285398 | A1 | 11/2009 | Liardet et al. | | |

OTHER PUBLICATIONS

Mamiya, H., Miyaji, A., Morimoto, H.: Efficient countermeasures against RPA, DPA, and SPA. In: Joye, M., Quisquater, J.-J. (eds.) CHES 2004. LNCS, vol. 3156, pp. 343-356. Springer, Heidelberg (2004).*
SDES. Rick Perry. Jan. 24, 2002. http://homepage.smc.edu/morgan_david/vpn/website-perry-sdes/all-sdes.html.*
French Search Report dated Sep. 8, 2010 from corresponding French Application No. 09/57782.
French Search Report dated Sep. 2, 2010 from corresponding French Application No. 09/57783.
Laurie Genelle et al., Securing AES Implementation against Fault Attacks, Fault Diagnosis and Tolerance in Cryptography (FDIC), 2009 Workshop on IEEE, Piscataway, NJ, Sep. 6, 2009, pp. 51-62, XP031627633.

* cited by examiner

*Primary Examiner* — Kambiz Zand
*Assistant Examiner* — Imhotep Durham
(74) *Attorney, Agent, or Firm* — Wolf, Greenfield & Sacks, P.C.

(57) ABSTRACT

A method for protecting a key used, by an electronic circuit, in a symmetrical algorithm for ciphering or deciphering a message, including the steps of complementing to one the key and the message; executing the algorithm twice, respectively with the key and the message and with the key and the message complemented to one, the selection between that of the executions which processes the key and the message and that which processes the key and the message complemented to one being random; and checking the consistency between the two executions.

20 Claims, 3 Drawing Sheets

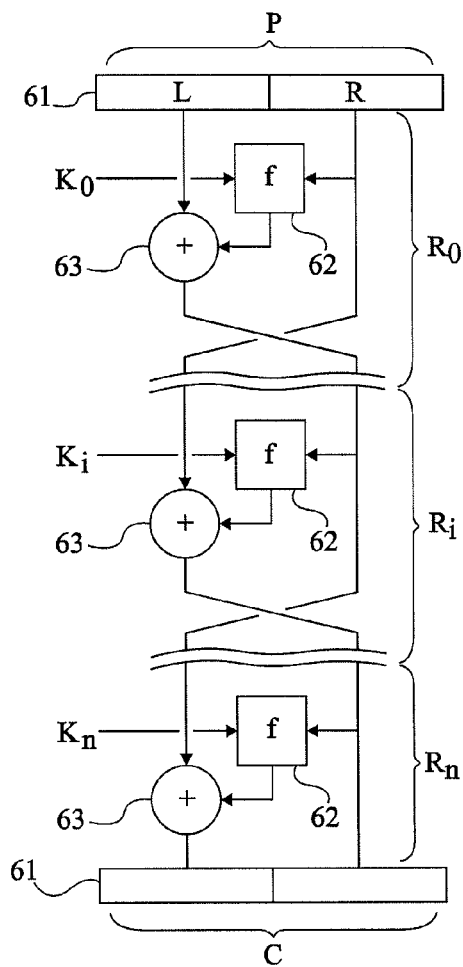
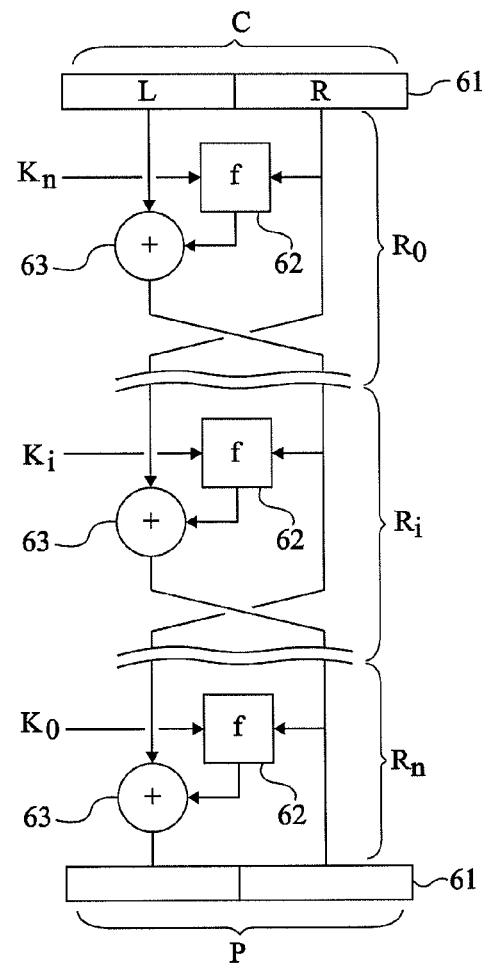
Fig 4A                    Fig 4B

PROTECTION OF A CIPHERING KEY

CROSS REFERENCE TO RELATED APPLICATIONS

This application claims the priority benefit of French patent application number 09/57782, filed on Nov. 4, 2009, entitled "Protection of a Ciphering Key," which is hereby incorporated by reference to the maximum extent allowable by law.

BACKGROUND OF THE INVENTION

1. Field of the Invention

The present invention generally relates to electronic circuits and, more specifically, to data processing units implementing ciphering or deciphering algorithms. The present invention more specifically relates to mechanisms for protecting one or several keys manipulated by such algorithms. In particular, the present invention applies to the detection of a unidirectional perturbation of bits of such a key.

2. Discussion of the Related Art

When a processing unit (typically, a cryptoprocessor) is used to implement a ciphering algorithm, it is desired to verify that the manipulated key is not modified (incidentally or deliberately), either during its transfer to the cryptoprocessor from an external circuit, or once in it while it is contained in a specific register of this cryptoprocessor. Attacks aiming at perturbing the state of the bit of a register of the cryptoprocessor generally are attacks using a laser pointed on bits of the register containing the key to perturb their value.

To counter a modification during the transfer, a solution is to reload the key in the cryptoprocessor as often as possible, generally on each new ciphering, or periodically. However, the key register of the cryptoprocessor remains sensitive to laser attacks.

To check the integrity of the key once it is in the cryptoprocessor, the simplest would be to read this key to control it outside of the cryptoprocessor. However, to protect the key against possible piracy attempts, the temporary storage element (register) which contains the key is generally only accessible in read mode from outside of the cryptoprocessor. The integrity check then amounts to checking the consistency of results obtained by two separate calculations using the key contained in the cryptoprocessor. These two calculations are either two cipherings of a same message with the key, or a ciphering followed by a deciphering.

However, the results of an integrity check mechanism may provide information to the attacker as to the value of the bits of the key. For example, if one of the bits of the key is modified in the key register and the old and new values of this bit are the same, the checking mechanism is incapable of noticing it, be the checking direct (by rereading) or indirect (by two separate calculations). This makes the key vulnerable to an attack or a perturbation known as a unidirectional perturbation, which comprises forcing a bit of the key to a single one of the possible values. For example, the attacked bit is forced to 0 whatever its initial state (1 or 0). The forcing of a bit to a single one of the two states may enable an attacker to determine the value of this bit according to whether his attack is or not detected (if it is not detected, then the actual bit of the key has the forced value—if it is detected, the actual bit of the key has the other state). By repeating this attack on each bit of the key, the value of said key can be obtained.

SUMMARY OF THE INVENTION

It would be desirable to have a mechanism of protection of the value of a key manipulated by a ciphering circuit, which overcomes all or part of the disadvantages of usual integrity check mechanisms.

It would also be desirable to detect a unidirectional perturbation of a bit of a key by detecting an inversion or a lack of inversion, without this making the key vulnerable.

To achieve all or part of these and other objects, at least one embodiment of the present invention provides a method for checking the integrity of a key used, by an electronic circuit, in a symmetrical algorithm for ciphering or deciphering a message, comprising the steps of:

complementing to one the key and the message;

executing the algorithm twice, respectively with the key and the message and with the key and the message complemented to one, the selection between that of the executions which processes the key and the message and that which processes the key and the message complemented to one being random; and checking the consistency between the two executions.

According to an embodiment of the present invention, the two executions are performed sequentially in a random order.

According to an embodiment of the present invention, the two executions are performed in parallel, by randomly selecting calculating registers.

According to an embodiment of the present invention, the two executions are cipherings, the result of one of the executions being complemented to one before the checking step.

According to an embodiment of the present invention, the two executions are a ciphering and a deciphering.

According to an embodiment of the present invention, the algorithm used is the DES algorithm or one of its variations.

The present invention also provides an electronic circuit capable of implementing the protection method.

The present invention also provides a system comprising an electronic ciphering or deciphering circuit and an electronic circuit for processing ciphered data or deciphered data, capable of implementing the protection method.

The foregoing objects, features, and advantages of the present invention will be discussed in detail in the following non-limiting description of specific embodiments in connection with the accompanying drawings.

BRIEF DESCRIPTION OF THE DRAWINGS

FIGS. 4A and 4B are block diagrams illustrating an example of ciphering and deciphering algorithm to which an integrity check is to be applied.

DETAILED DESCRIPTION

Figure 1:
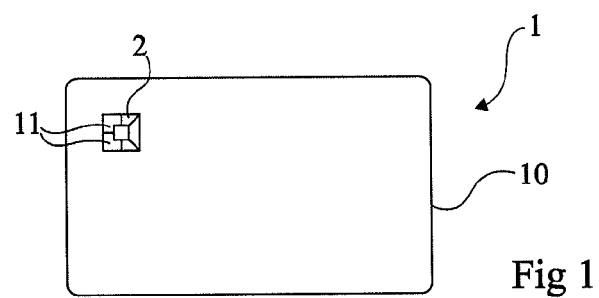
FIG. 1 is a simplified view of a chip card of the type to which the present invention applies as an example.

The same elements have been designated with the same reference numerals in the different drawings. For clarity, only those steps and elements which are useful to the understanding of the present invention have been shown and will be described. In particular, what exploitation is made of the data to be ciphered or of the ciphered data has not been detailed, the present invention being compatible with any exploitation. Further, the elements of the cryptographic processing unit or of the other circuits have not been detailed, the present invention being here again compatible with usual structures. Reference will be made hereafter to term "ciphering" to designate, unless otherwise mentioned, a ciphering and/or a deciphering, which are similar mechanisms (application of an algorithm to data and one or several keys).

FIG. 1 is a simplified representation of a chip card 1 of the type to which the embodiments which will be described apply as an example. Such a card 1 is formed of a support 10, for example, made of plastic matter, which supports or comprises one or several integrated circuits 2. Circuit(s) 2 are capable of communicating with the outside of the card (for example, with a read or read-write terminal) by means of contacts 11 or by contactless transceiver elements (not shown) such as an electromagnetic transponder. Circuits 2 comprise at least one ciphering unit (generally called a cryptoprocessor) capable of executing ciphering and/or deciphering calculations based on one or several keys loaded in the processing unit.

The use of ciphering algorithms has many applications in electronics, be it for chip card systems, toll television systems, ciphered communication systems, etc. In all cases, there is an algorithmic processing unit capable of implementing ciphering and/or deciphering mechanisms.

Figure 2:
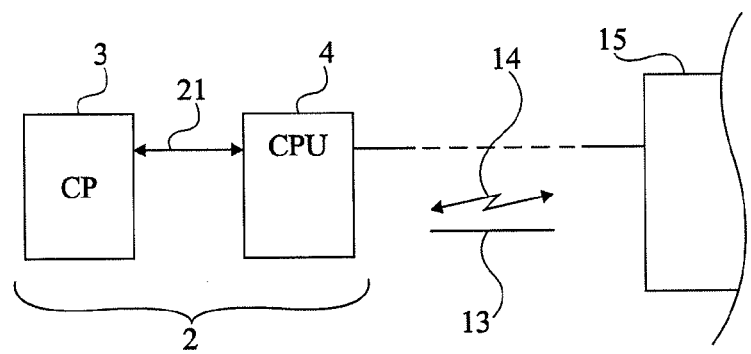
FIG. 2 is a block diagram of a system using a ciphering/deciphering unit of cryptoprocessor type.

FIG. 2 is a block diagram of a system using a cryptoprocessor 3 (CP). This cryptoprocessor is an integrated circuit considered as tamper-proof, which implements one or several ciphering or deciphering algorithms applied to data that it receives from the outside, by using one or several keys that it contains or that it receives from the outside. Cryptoprocessor 3 is, for example, capable of communicating with a processing unit 4 (for example, a central processing unit CPU) of a circuit 2 integrating both elements 3 and 4 (and generally other circuits, not shown, such as volatile or non volatile memories, an input-output interface, etc.). Circuit 2 is capable of communicating over a wire link 13 or over a wireless link 14 with a separate device 15, for example, a circuit for exploiting the ciphered or deciphered data.

Figure 3:
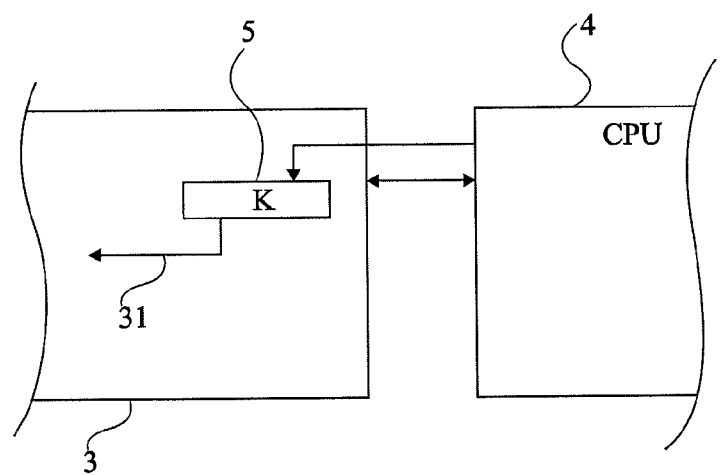
FIG. 3 is a partial block diagram of a circuit integrating a ciphering/deciphering unit and a central processing unit.

FIG. 3 is a detail of the diagram of FIG. 2 showing, in circuit 3, an internal temporary storage element 5 (typically a register). Of course, unit 3 generally comprises several registers for temporarily storing the ciphered data, the data to be ciphered and other variables, as well as other elements enabling it to execute the ciphering algorithm (wired logic, memories, software instruction processing unit, etc.). A specific register intended to contain ciphering key K is here considered. This register 5 will here be designated as a key register. Unit 3 may contain several key registers. The content of register 5 is read by cryptoprocessor 3 (connection 31) each time it needs the key for a ciphering or deciphering operation.

FIGS. 4A and 4B respectively illustrate, in the form of blocks, the architecture of ciphering and deciphering algorithms of the type to which the protection applies as an example.

The concerned algorithms are so-called Feistel algorithms. Such algorithms perform a symmetrical ciphering, by blocks, and are characterized by similar or even identical ciphering and deciphering operations, only requiring an inversion of the order in which the keys (or sub-keys) extracted from the key contained in the key register are used. Most often, Feistel networks or diagrams combine several rounds of identical operations comprising a diffusion function (for example, a bit permutation), a non-linear function (for example, of substitution type) generating a confounding effect, and a linear mixture using a bit-to-bit combination (bit-to-bit XOR). Among Feistel algorithms, those respecting the property that the result of the ciphering of a message by a key is equal to the ones' complement of the result of the ciphering of the ones' complement of the message by the ones' complement of the key will be selected.

An example of a Feistel algorithm respecting this property is the DES algorithm (Data Encryption Standard) and its different variations. Other examples are the algorithms known as LOKI and GHOST.

The ciphering operation (FIG. 4A) comprises submitting a message to be ciphered P (plain text) to successive operations. Message P is separated in two portions of identical sizes (arbitrarily designated as right-hand portion R and left-hand portion L). This message is contained in a register 61 of circuit 3 (or in two registers respectively assigned to the right-hand and left-hand portions). The algorithm is performed in n+1 rounds $R_i$ (with i ranging between 0 and n>1). In each round, right-hand portion R of register 61 is submitted (block 62) to a non-linear function f with a sub-key $K_i$ (with i ranging from 0 to n). This sub-key is obtained from a general ciphering key (typically, key K contained in register 5—FIG. 3). The result of the ciphering function is mixed (block 63, bit-to-bit addition modulo 2 or bit-to-bit XOR combination) with left-hand portion L of the register which corresponds to the result of the previous round (message P for first round $R_0$). Finally, right-hand and left-hand portions R and L are permuted for the next round. At the end of the n-th round, ciphered message C is obtained. Last round $R_n$ generally comprises no permutation of the right-hand and left-hand portions. Message C is generally contained in register 61 which has been used during the entire calculation. The same calculation cell (function 62 and combiner 63) may be used for each round.

The deciphering operation (FIG. 4B) comprises submitting a ciphered message C (ciphered text) to the n rounds $R_i$ but by using the sub-keys in a reverse order (starting with key $K_n$ to end with key $K_0$), to obtain plain text P.

In the case of the DES algorithm, the first round is preceded by a bit mixing operation (permutation) and the last round is followed by the reverse operation.

Figure 5:
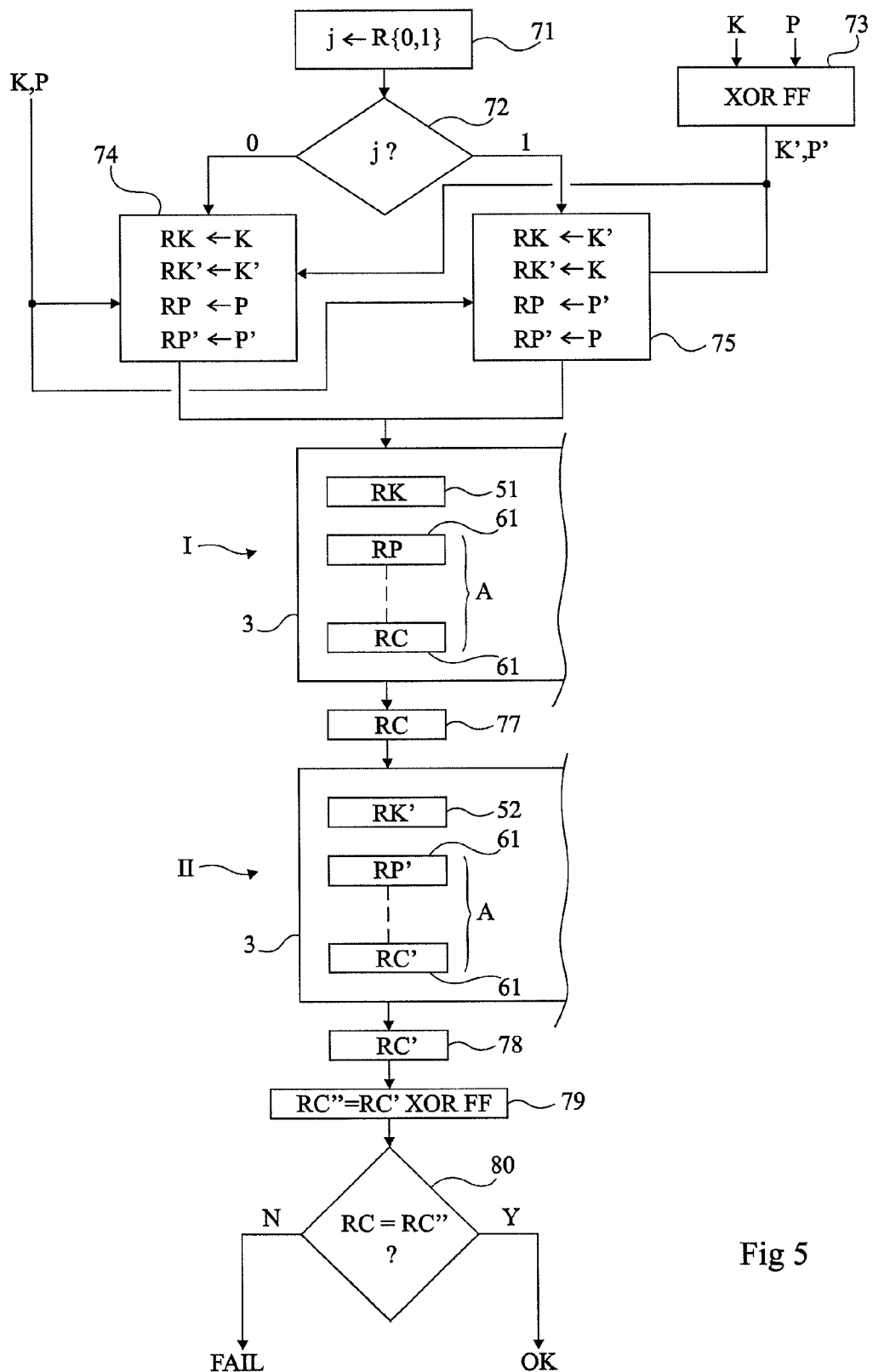
FIG. 5 very schematically illustrates in the form of blocks an embodiment of the checking mechanism.

FIG. 5 is a block diagram of an embodiment of a mechanism for checking the integrity of a key K, protected against a unidirectional perturbation of a bit of the key.

In this example, a non-deterministic selection (random or pseudo-random) is performed (block 71, j←R{0, 1}) between two values (for example, 0 or 1) to select the order in which the checking steps will be carried out.

According to state 0 or 1 of selection bit j (block 72, j?), key K and plain text P and their respective complements to one (block 73, XOR FF) K' and P' are transferred to different registers. In FIG. 5, this is illustrated by the use of intermediary variables RK, RK', RP, and RP' into which are respectively loaded values K, K', P, and P' (block 74, RK←K, RK'←K', RP←P and RP'←P') or values K', K, P', and P (block 75, RK←K', RK'←K, RP←P', and RP'←P) according to whether bit j is at state 0 or 1. Variable RK is loaded into a register 51 and variable RK' is loaded into a register 52. The complements to one may be performed by the central processing unit causing the loading into the concerned registers or, if its set of instruction allows it, by cryptoprocessor 3. Two applications I and II of algorithm A are successively performed by using key RK contained in register 51 to cipher variable RP loaded into a register 61, and by subsequently using key RK' contained in register 52 and variable RP' loaded in turn into register 61. In the example of FIG. 5, it is assumed that application I, by cryptoprocessor 3, of algorithm A to message P is performed in a register 61 and that its application II to message P' is performed in the same register.

In this case, the first obtained result RC is transferred into a register 77 before the second application of the algorithm having its result RC', when obtained, transferred into a register 78. As a variation, different registers are used for two calculations I and II, which avoids transferring the results. The consistency between result RC and the ones' complement (block 79, RC"=RC' XOR FF) of result RC' is checked (block 80, RC=RC"?) by checking whether they are identical (OK, output Y of block 80). A integrity failure of the key (FAIL, output N of block 80), that is, a modification of at least one bit of the key between the two executions of the algorithm is thus detected. The comparison is preferably performed by the cryptoprocessor. A integrity failure is used to prevent the ciphered result from exiting the cryptoprocessor, or to take any other appropriate action in case an incidental or deliberate modification (attack) is suspected.

This implementation takes advantage of the previously-indicated property (for any message P and any key K, the ones' complement C' of result C of ciphering algorithm A is equal to the result of the application of this algorithm to complemented message P' with complemented key K'). This property translates as the fact that non-linear function f of algorithm A respects the fact that the result ($f(X, K_i)$) of its application to a datum X with a sub-key $K_i$ is equal to the result ($f(X', K_i')$) of its application to the complements to one X' of the datum and $K_i'$ of the sub-key. Among Feistel algorithms, those having a function respecting this property will thus be selected. Such is especially the case for the DES, LOKI, and GHOST algorithms, but not for those known as RC5, Twofish, Blowfish, or Camelia.

It should be noted that the calculations of the complements to one of the key and of the message (block 73) may be performed at the beginning of the process or on the fly during the first or second application of the algorithm according to the state of the random selection. Similarly, rather than transferring the key and its complement into the two registers 51 and 52, a single register may be used in the case where the two applications of the algorithm are not simultaneous. As a variation, if the two executions I and II are performed in parallel (and thus, at the same time), four registers must be used for variables RK, RK', RP, and RP'.

The result which may be output from the cryptoprocessor (placed in an internal storage element, accessible in read mode by central unit 2 or another circuit using processor 3) is in any of registers 77 and 78 and has been checked.

When an attacker targets an attack by unidirectional perturbation of a bit of key register 51 or 52, the fault detection capable of providing him with information will indicate a fault which depends on the used sequence and not on the key used. For example, if the attack comprises forcing a bit to 0 and the bit is initially 1, a fault will be detected on the execution with key K but not on the execution with ones' complement K'. Conversely, if the bit is initially 0 (its value is thus not modified by the attack), the fault will be detected on the execution with key K' but not on the execution with key K.

The fact of randomly selecting (more generally, in non-deterministic fashion) that of executions I and II which processes the data (key and message) and that which processes the complemented data thus avoids that the result of test 80 is exploitable in case of an attack by unidirectional perturbation. In fact, the probability for the state of the bit deduced from the result of test 80 to be the right one is ½. Accordingly, for each bit, there is one chance out of two to mislead an attacker.

It should however be impossible to distinguish sequences I and II during their execution. For this purpose, sequence I which uses the message and the plain key preferably comprises calculations identical to the ones' complement calculations but with value 0 (to avoid modifying the bit values). As compared with the representation of FIG. 5, this amounts to adding calculations on key K, message P, and result S corresponding to bit-to-bit XOR combinations with value 0.

The steps listed hereafter illustrate an example of successive operations using a same DES calculation cell of circuit 3 (this example corresponds to FIG. 5 where a same register 61 is used for the two calculations):

1. Random selection of bit j. According to state 0 or 1 of the bit, execution of a sequence I', then of a sequence II', or execution of sequence II' followed by sequence I'.

Sequence I':
21. Calculation on message P (bit-to-bit XOR with value 0);
22. Loading of P into register 61;
23. Calculation on key K (bit-to-bit XOR with value 0);
24. Loading of register 51 with value K;
25. Selection of register 51 as the key register of the DES;
26. Execution of the DES;
27. Unloading of result RC into register 77; and
28. Calculation on result RC (bit-to-bit XOR with value 0);

Sequence II':
21'. Calculation of the ones' complement P' of message P (bit-to-bit XOR with value 1);
22'. Loading of P' into register 61;
23'. Calculation of the ones' complement K' of key K (bit-to-bit XOR with value 1);
24'. Loading of register 52 with value K';
25'. Selection of register 52 as the key register of the DES;
26'. Execution of the DES;
27'. Unloading of result RC' into register 78; and
28'. Calculation of ones' complement RC" of result RC' (bit-to-bit XOR with value 1);

and finally:
3. Checking that results RC and RC" are identical.

According to an alternative embodiment, rather than checking the identity between results RC and RC" of two successive applications of the algorithm, a ciphering followed by a deciphering is performed. Thus, result RC of the first application I of the ciphering with key RK (which is K or K' according to the state of bit j) is deciphered (algorithm $A^{-1}$) by using key RK' (which corresponds to the ones' complement of key RK). Then, the result of the deciphering complemented to one is compared with initial message P.

This provided protection mechanism is compatible with usual cryptoprocessor structures and requires no modification thereof (except, for certain variations, for the ones' complement function if it is desired to be internal to circuit 3). In particular, it is always possible to choose between a parallel or series check and to share the calculation cell.

The efficiency of such a protection mechanism can be observed by modifying, after the loading of the key into the cryptoprocessor or on each loading of this key, one of the bits of the key register. If the mechanism has been implemented, the application of the key obtained by the attack does not allow the ciphering. In the opposite case, the unidirectional attack provides the key.

An additional advantage of the performed checking is that it checks the very execution of the ciphering algorithm. Indeed, if an error occurs during the execution of the algorithm, the results will not match.

On the other hand, due to the random selection of the order of the applications of the algorithm, the hacker cannot determine the original state of the key since the unidirectional perturbation will occur with an equal probability for each bit of the key.

Different embodiments have been described. Different alterations, modifications, and improvements are within the abilities of those skilled in the art. In particular, the choice between a parallel or series execution (successive executions) in practice depends on a compromise between the processing speed and the cryptoprocessor bulk. Further, the practical implementation is within the abilities of those skilled in the art based on the functional indications given hereabove, be it for a software or hardware implementation. Further, although the present invention has been described in relation with Feistel algorithms, it more generally applies to symmetrical algorithms for which the result of the ciphering of a message by a key is equal to the ones' complement of the result of the ciphering of the ones' complement of the message by the ones' complement of the key.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for checking an integrity of a key used, by an electronic circuit, in a symmetrical algorithm for ciphering or deciphering a message, the method comprising the steps of:
   complementing to one the key to provide a key complemented to one;
   complementing to one the message to provide a message complemented to one;
   executing the symmetrical algorithm twice, the execution comprising:
      randomly determining whether to first execute the symmetrical algorithm with the key and the message and subsequently execute the symmetrical algorithm with the key complemented to one and the message complemented to one or whether to first execute the symmetrical algorithm, with the key complemented to one and the message complemented to one and subsequently execute the symmetrical algorithm with the key and the message; and
      executing the symmetrical algorithm twice based on the determination; and
   checking a consistency between the execution of the symmetrical algorithm with the key and the message and the execution of the symmetrical algorithm with the key complemented to one and the message complemented to one.

2. The method of claim 1, wherein the two executions of the symmetrical algorithm are performed sequentially in a random order.

3. The method of claim 1, wherein the two executions of the symmetrical algorithm are performed in parallel, by randomly selecting calculating registers.

4. The method of claim 1, wherein the two executions of the symmetrical algorithm are cipherings, and a result of one of the two executions being complemented to one before the checking step.

5. The method of claim 2, wherein the two executions of the symmetrical algorithm are a ciphering and a deciphering.

6. The method of claim 1, wherein the symmetrical algorithm comprises a Data Encryption Standard or at least one variation of the Data Encryption Standard.

7. An electronic circuit capable of protecting a key used by the electronic circuit in a symmetrical algorithm for ciphering or deciphering a message, the electronic circuit configured to:
   complement to one the key to provide a key complemented to one;
   complement to one the message to provide a message complemented to one;
   execute the symmetrical algorithm twice, the execution comprising:
      randomly determining whether to first execute the symmetrical algorithm with the key and the message and subsequently execute the symmetrical algorithm with the key complemented to one and the message complemented to one or whether to first execute the symmetrical algorithm, with the key complemented to one and the message complemented to one and subsequently execute the symmetrical algorithm with the key and the message; and
      executing the symmetrical algorithm twice based on the determination; and check a consistency between the execution of the symmetrical algorithm with the key and the message and the execution of the symmetrical algorithm with the key complemented to one and the message complemented to one.

8. A system comprising an electronic ciphering or deciphering circuit for protecting a key used in an algorithm for ciphering or deciphering a message and an electronic circuit for processing ciphered data or deciphered data, the system configured to:
   complement to one the key to provide a key complemented to one;
   complement to one the message to provide a message complemented to one;
   execute the algorithm twice, the execution comprising:
      randomly determining whether to first execute the algorithm with the key and the message and subsequently execute the algorithm with the key complemented to one and the message complemented to one or whether to first execute the algorithm, with the key complemented to one and the message complemented to one and subsequently execute the algorithm with the key and the message; and
      executing the algorithm twice based on the determination; and
   check a consistency between the execution of the algorithm with the key and the message and the execution of the algorithm with the key complemented to one and the message complemented to one.

9. The method of claim 1, wherein checking the consistency comprises detecting a unidirectional perturbation of a bit of the key by detecting an inversion or a lack of inversion.

10. The method of claim 9, wherein detecting the unidirectional perturbation is performed without making the key vulnerable.

11. The electronic circuit of claim 7, wherein the two executions of the symmetrical algorithm are performed in parallel, by randomly selecting calculating registers.

12. The electronic circuit of claim 7, wherein the two executions of the symmetrical algorithm are cipherings, and a result of one of the two executions is complemented to one before the checking step.

13. The electronic circuit of claim 7, wherein the symmetrical algorithm comprises a Data Encryption Standard or at least one variation of the Data Encryption Standard.

14. The electronic circuit of claim 7, wherein the key complemented to one is stored in a register separate from a register storing the key.

15. The electronic circuit of claim 7, wherein the key and the key complemented to one are stored in the same register.

16. The electronic circuit of claim 7, wherein the two executions of the symmetrical algorithm are performed in the same register.

17. The system of claim 8, wherein the two executions of the algorithm are performed in parallel, by randomly selecting calculating registers.

18. The system of claim 8, wherein the two executions of the algorithm are cipherings, and a result of one of the two executions is complemented to one before the checking step.

19. The system of claim 8, wherein the algorithm comprises a Data Encryption Standard or at least one variation of the Data Encryption Standard.

20. The system of claim 8, wherein the algorithm comprises an algorithm for which a result of a ciphering of a message by a key is equal to a ones' complement of a result of a ciphering of a message complemented to one by a key complemented to one.

\* \* \* \* \*